(12) United States Patent
Zheng et al.

(10) Patent No.: US 12,474,318 B2
(45) Date of Patent: Nov. 18, 2025

(54) METHOD FOR DETERMINING METALLOGENIC POTENTIAL OF PORPHYRY BY USING TRACE ELEMENTS AND B ISOTOPE OF TOURMALINE

(71) Applicants: Tibet Julong Copper Co., Ltd., Lhasa (CN); CHINA UNIVERSITY OF GEOSCIENCES (WUHAN), Wuhan (CN)

(72) Inventors: Youye Zheng, Wuhan (CN); Xin Chen, Wuhan (CN); Xiaofang Dou, Wuhan (CN); Jianhui Wu, Wuhan (CN); Feng Gao, Wuhan (CN); Yibin Lin, Wuhan (CN); Jiancuo Luosang, Wuhan (CN); Nan Chao, Wuhan (CN); Shunli Zheng, Wuhan (CN)

(73) Assignees: Tibet Julong Copper Co., Ltd., Lhasa (CN); CHINA UNIVERSITY OF GEOSCIENCES (WUHAN), Wuhan (CN)

( * ) Notice: Subject to any disclaimer, the term of this patent is extended or adjusted under 35 U.S.C. 154(b) by 291 days.

(21) Appl. No.: 18/452,547

(22) Filed: Aug. 20, 2023

(65) Prior Publication Data
US 2024/0272135 A1 Aug. 15, 2024

(30) Foreign Application Priority Data
Feb. 13, 2023 (CN) .......................... 202310106120.9

(51) Int. Cl.
*G01N 33/2028* (2019.01)
*G01N 33/24* (2006.01)

(52) U.S. Cl.
CPC ....... *G01N 33/2028* (2019.01); *G01N 33/246* (2013.01)

(58) Field of Classification Search
CPC .. G01N 33/2028; G01N 33/246; G01N 33/24; G01N 27/628; G01N 21/84; G01N 23/225
See application file for complete search history.

(56) References Cited

U.S. PATENT DOCUMENTS

| 11,378,563 B2 | 7/2022 | Abedini |
| 11,726,060 B2 | 8/2023 | Calvo et al. |
| 2022/0057364 A1 | 2/2022 | Aoki |

FOREIGN PATENT DOCUMENTS

CN          115078520 A    *  9/2022    .............  G01N 27/64

OTHER PUBLICATIONS

Beckett-Brown et al. "Trace Element Characteristics of Tourmaline in Porphyry Cu Systems: Development and Application to Discrimination." The Canadian Journal of Mineralogy and Petrology, published Mar. 10, 2023. (Year: 2023).*

(Continued)

*Primary Examiner* — Benjamin R Schmitt
(74) *Attorney, Agent, or Firm* — True Shepherd LLC; Andrew C. Cheng

(57) ABSTRACT

In a method for determining metallogenic potential of a porphyry by using trace elements and a B isotope of tourmaline, redox properties of magma is determined with $Fe^{3+}/(Fe^{2+}+Fe^{3+})$ of tourmaline; then a water content and a content of metal Cu of the magma are determined with contents of $H_2O$ and Cu in the tourmaline; and a source of the magma is determined with a B isotope of the tourmaline, the water content, oxygen fugacity and metal content and source of the magma are finally determined, and finally, whether the magma has metallogenic potential of a porphyry is comprehensively determined. The present disclosure determines a key control factor of porphyry copper with a mineral of the tourmaline, and overcomes the difficulties in (Continued)

low efficiency, a long period and high cost of a traditional method for determining metallogenic potential.

2 Claims, 4 Drawing Sheets

(56) References Cited

OTHER PUBLICATIONS

Zheng et al. "Identifying potential porphyry copper mineralization at the Zhu'nuo ore-cluster district in western Gangdese, southern Tibet: Insights from shortwave infrared (SWIR) spectrometry and geochemical anomalies." Ore Geology Reviews, published Dec. 2022. (Year: 2022).*
Berger et al. "Preliminary Model of Porphyry Copper Deposits." US Geological Survey, published 2008. (Year: 2008).*

* cited by examiner

METHOD FOR DETERMINING METALLOGENIC POTENTIAL OF PORPHYRY BY USING TRACE ELEMENTS AND B ISOTOPE OF TOURMALINE

CROSS-REFERENCE TO RELATED APPLICATIONS

This application claims priority to Chinese Patent Application No. 202310106120.9 with a filing date of Feb. 13, 2023. The content of the aforementioned application, including any intervening amendments thereto, is incorporated herein by reference.

TECHNICAL FIELD

The present disclosure relates to the technical field of ore detection, and in particular to a method for determining metallogenic potential of a porphyry by using trace elements and a B isotope of tourmaline.

BACKGROUND

As an important source of copper resources, the porphyry deposit typically has the features of large tonnage, low grade, large-scale hydrothermal alteration and enrichment of metal sulfide. Magma having high oxygen fugacity, water content and metal content is required to form the large porphyry deposit. Moreover, magmatic water crucially controls migration of metal elements and precipitation of an ore-bearing hydrothermal fluid, and the high oxygen fugacity causes deep metals to be released from a sulfide phase to be brought into a shallow metallogenic system. It is also crucial to add mantle-derived magma in order to form porphyry copper. As a result, the magma having a high water content, oxygen fugacity, and metal content functions as an important condition to form large-ultra-large porphyry copper, and it is essential for mineralization to determine whether the mantle-derived magma is added.

How to determine the water content, the metal content and source of the magma is a challenge, which also crucially restricts rapid evaluation of prospecting potential at a scale of an ore-concentrated region. Previous research mainly reflected the oxygen fugacity and the metal content of the magma by means of indicators such as ratios of Sr/Y, V/Sc, and $Al_2O_3/TiO_2$ and a content of Cu in the entire rock. However, a rock mass is prone to alteration during hydrothermal transformation, and it is hence extremely difficult to truly reflect the oxygen fugacity and the metal content of the magma through the entire rock data. Some scholars have utilized a composition of trace elements of zircon to invert redox properties of the magma, so as to further predict metallogenic potential of magmatic rock and determine a mineralization scale. However, variations in the trace elements in the zircon have multiple solutions, which cannot reflect key factors such as the water content and the metal content of the magma well, and cannot completely satisfy current requirements of prospecting evaluation. As a result, it is necessary to explore a novel, efficient and suitable method for metallogenic potential of porphyry copper from key control factors including water content, oxygen fugacity, and metal content and source, especially for a fragile ecological environment in a western region of China. It is an urgent and important task to innovate a rapid copper prospecting method at the scale of the ore-concentrated region, which is also an urgent need to ensure safety of strategic mineral resources in China.

Regarding the determination of a metallogenetic rock mass of the porphyry copper, major and trace elements (Sr/Y, V/Sc, $Al_2O_3/TiO_2$ and Cu) and Sr—Nd—Hf—Pb isotopes of the entire rock are currently utilized in combination with zircon to determine the metallogenic potential. However, the major and trace elements of the entire rock are not capable of reflecting the water content, the oxygen fugacity and the metal content of the magma in the porphyry copper, because a rock mass in a mining region widely suffers from hydrothermal alteration, and the metal content in the major and trace elements of the entire rock is increased due to a number of metals brought by the ore-bearing hydrothermal solution. Moreover, hydrothermal alteration can also change ratios of Sr/Y, V/Sc and $Al_2O_3/TiO_2$, and the Sr—Nd—Hf—Pb isotopes, resulting in uncertainty in determination of the oxygen fugacity and the source region. The zircon is a relatively stable mineral which is not prone to alteration during hydrothermal alteration. However, the trace elements and the Hf isotope of the zircon can only reflect the oxygen fugacity and the source region, but cannot reflect the water content and the metal content.

SUMMARY OF PRESENT INVENTION

Aiming at the above defects in the prior art, the objective of the present disclosure is to provide a method for determining metallogenic potential of a porphyry by using trace elements and a B isotope of tourmaline.

A method for determining metallogenic potential of a porphyry by using trace elements and a B isotope of tourmaline of the present disclosure specifically includes:

S1, delineating a metallogenic section: collecting geological data, geophysical data and geochemical data according to a selected research region, comprehensively analyzing a metallogenic prospect, and delineating a favorable metallogenic section;

S2, collecting samples: collecting the samples from porphyries having metallogenic potential in the favorable metallogenic section, and picking out tourmaline in the samples;

S3, analyzing the tourmaline:

analyzing major elements of the tourmaline: observing features of the corresponding tourmaline under a microscope and a cathode luminescence image, recording petrographic features of the tourmaline in detail, analyzing contents of the major elements in the tourmaline in different regions by using an electron probe to obtain a molecular formula of the tourmaline, and determining a content of $H_2O$ in the tourmaline with the molecular formula of the tourmaline;

analyzing trace elements of the tourmaline: carrying out laser ablation inductively coupled plasma mass spectrometry in-situ micro-region element analysis on the tourmaline samples at the same position to obtain contents of the trace elements, including contents of Sr, Y and Cu elements, of the tourmaline of each test point; and analyzing the B isotope ($\delta^{11}B$) of the tourmaline: carrying out multi-acceptance laser ablation inductively coupled plasma mass spectrometry in-situ B isotope analysis on the tourmaline samples at the same position to obtain $\delta^{11}B$ isotope composition of each test point;

S4, determining metallogenic potential of the porphyry with oxygen fugacity, water content, and metal content and source:

wherein the oxygen fugacity is determined by: analyzing data obtained from analysis of the major elements, if a ratio of $Fe^{3+}/(Fe^{2+}+Fe^{3+})$ is less than 0.45 and a ratio of Mg/(Mg+Fe) is less than 0.5, it is indicated that the porphyries have no metallogenic potential of a porphyry, and otherwise, it is indicated that the porphyries containing the tourmaline have potential to form porphyry copper;

the water content is determined by: analyzing data obtained by analyzing the major element and analyzing the trace elements, if a content of $H_2O$ is less than 3.58 and a ratio of Sr/Y is less than 200, it is indicated that the porphyries have no metallogenic potential of a porphyry, and otherwise, it is indicated that the porphyries containing the tourmaline have the potential to form the porphyry copper;

the metal content is determined by: analyzing data obtained by analyzing the trace elements, if a content of Cu is less than 1.5 and a ratio of Sr/Y is less than 200, it is indicated that the porphyries have no metallogenic potential of a porphyry, and otherwise, it is indicated that the porphyries containing the tourmaline have a high content of Cu and have the potential to form the porphyry copper; and the source is determined by: analyzing data obtained by analyzing the B isotope, if the tourmaline in the porphyries satisfies a content of $\delta^{11}B$ being between −8.5 and −5 and a ratio of Sr/Y being lower than 200, it is indicated that the porphyries have a contribution of mantle-derived magma and have the potential to form a porphyry copper deposit;

if the porphyries is determined to have the high water content, oxygen fugacity and metal content of the magma according to above four determination conditions, the porphyries have a contribution of a mantle-derived material, and have excellent copper metallogenic potential, the porphyries are capable of being determined as a copper metallogenic rock mass, and a possibility of finding copper is greater than 80%, a prospecting target region is delineated within a certain radius according to an exposure position of the porphyry; and otherwise the porphyries are a non-metallogenic rock mass having small prospecting potential, and a target region is not delineated.

In one embodiment, the major elements include Si, Al, Fe, Mg, Mn, $Fe^{2+}$, $Fe^{3+}$, Ca, Na, K, P and F.

According to the method for determining metallogenic potential of a porphyry by using trace elements and a B isotopes of tourmaline, the present disclosure, redox properties of magma is determined with $Fe^{3+}/(Fe^{2+}+Fe^{3+})$ of tourmaline; then a water content and a content of metal Cu of the magma are determined with contents of $H_2O$ and Cu in the tourmaline; and a source of the magma is determined with a B isotope of the tourmaline, the water content, oxygen fugacity and metal content and source of the magma are finally determined, and finally, whether the magma has metallogenic potential of a porphyry is comprehensively determined.

The present disclosure determines a key control factor of porphyry copper with a mineral of the tourmaline, and overcomes the difficulties in low efficiency, a long period and high cost of a traditional method for determining metallogenic potential.

A possibility of finding a copper deposit by means of the present disclosure is greater than 80%, and the present disclosure is an extremely recommendable method for determining metallogenic potential of porphyry copper. The method determines the water content, the oxygen fugacity, the metal content and the source of the magma with the tourmaline. The method is firstly put forward at home and abroad, belongs to an original innovation achievement, and can provide a theoretical basis for further reduction in the prospecting target region in a scale of an ore-concentrated region and improve prospecting efficiency.

The present disclosure solves the international problem that it is difficult to accurately and rapidly determine the water content, the oxygen fugacity, the metal content and the source of the magma under the same standard, establishes a method and flow for inverting key control factors (the water content, the oxygen fugacity, and the metal content and source) of copper mineralization of the porphyry copper by using the elements and the B isotope of the tourmaline, and provides a possibility for further prediction on the metallogenic potential of the porphyry copper.

The present solution is a novel prospecting method that is economic, green and efficient. By collecting a lot of data for verification, it is found that a possibility of finding the porphyry copper deposit by means of the method is greater than 80%.

DETAILED DESCRIPTION OF THE EMBODIMENTS

Figure 1:
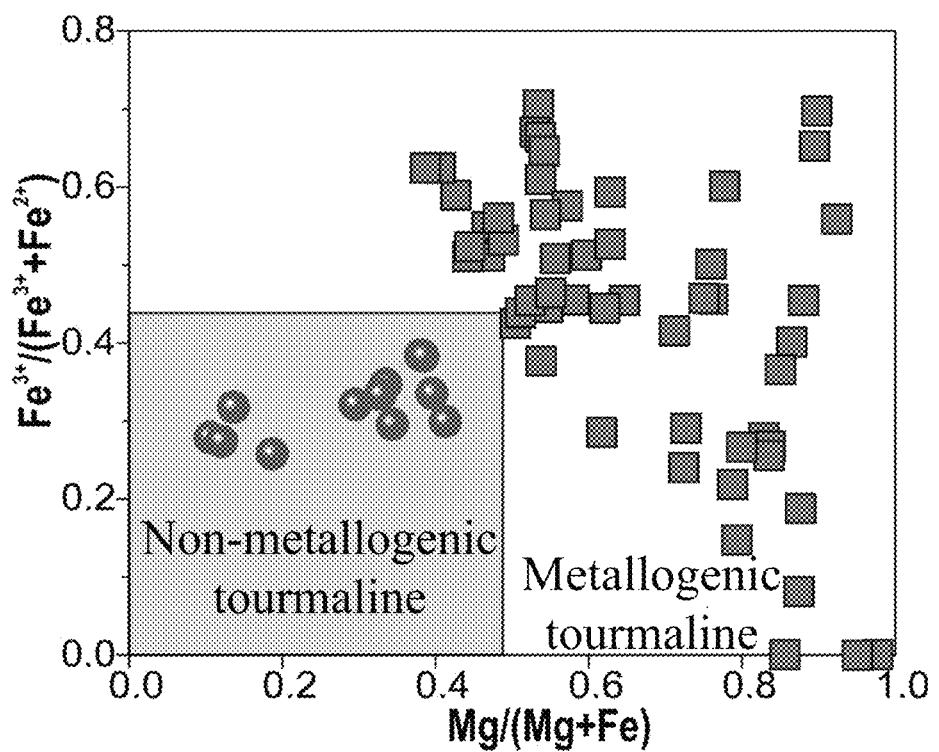
FIG. 1 is a diagram of $Fe^{3+}/(Fe^{2+}+Fe^{3+})$ vs. Mg/(Mg+Fe) of tourmaline of a Beimulang region.

The technical solutions of the present disclosure are further described below with reference to particular embodiments and in combination with the accompanying drawings of the present disclosure. However, the present disclosure is not limited to these embodiments.

A method for determining metallogenic potential of a porphyry by using trace elements and a B isotope of tourmaline of the present disclosure specifically includes:

S1, delineate a metallogenic section: collect geological data, geophysical data and geochemical data according to a selected research region, comprehensively analyze a metallogenic prospect, and delineate a favorable metallogenic section;

S2, collect samples: collect the samples from porphyries having metallogenic potential in the favorable metallogenic section, and pick out tourmaline in the samples;

S3, analyze the tourmaline:

analyze major elements of the tourmaline: observe features of the corresponding tourmaline under a microscope and a cathode luminescence image, record petrographic features of the tourmaline in detail, analyze contents of the major elements in the tourmaline in different regions by using an electron probe to obtain a molecular formula of the tourmaline, and determine a content of $H_2O$ in the tourmaline with the molecular formula of the tourmaline, where the major elements include Si, Al, Fe, Mg, Mn, $Fe^{2+}$, $Fe^{3+}$, Ca, Na, K, P and F;

analyze trace elements of the tourmaline: carry out laser ablation inductively coupled plasma mass spectrometry in-situ micro-region element analysis on the tourmaline samples at the same position to obtain contents of the trace elements, including contents of Sr, Y and Cu elements, of the tourmaline of each test point; and analyze the B isotope of the tourmaline: carry out multi-acceptance laser ablation inductively coupled plasma mass spectrometry in-situ B isotope analysis on the tourmaline samples at the same position to obtain $\delta^{11}B$ isotope composition of each test point;

S4, determine metallogenic potential of the porphyry with analyzed oxygen fugacity, water content, and metal content and source:

oxygen fugacity determination: analyze data obtained from analysis of the major elements, where under the condition that $Fe^{3+}/(Fe^{2+}+Fe^{3+})$ is less than 0.45 and a ratio of Mg/(Mg+Fe) is less than 0.5, it is indicated that the porphyries have no metallogenic potential of a porphyry, and otherwise, it is indicated that the porphyries containing the tourmaline have potential to form porphyry copper;

water content determination: analyze data obtained by analyzing the major element and analyzing the trace elements, where under the condition that $H_2O$ is less than 3.58 and a ratio of Sr/Y is less than 200, it is indicated that the porphyries have no metallogenic potential of a porphyry, and otherwise, it is indicated that the porphyries containing the tourmaline have the potential to form the porphyry copper;

metal content determination: analyze data obtained by analyzing the trace elements, where under the condition that a content of Cu is less than 1.5 and a ratio of Sr/Y is less than 200, it is indicated that the porphyries have no metallogenic potential of a porphyry, and otherwise, it is indicated that the porphyries containing the tourmaline have a high content of Cu and have the potential to form the porphyry copper; and source determination: analyze data obtained by analyzing the B isotope, where under the condition that tourmaline in the porphyries satisfies $\delta^{11}B$ between −8.5 and −5 and a ratio of Sr/Y is lower than 200, it is indicated that the porphyries have a contribution of mantle-derived magma and have the potential to form a porphyry copper deposit;

where under the condition that the porphyries satisfy determination conditions of four aspects above, it is indicated that the porphyries have the high water content, oxygen fugacity and metal content of the magma, have a contribution of a mantle-derived material, and have excellent copper metallogenic potential, the porphyries are capable of being determined as a copper metallogenic rock mass, and a possibility of finding copper is greater than 80%, delineate a prospecting target region within a certain radius according to an exposure position of the porphyry; and under the condition that the porphyries do not satisfy the indicators of the four aspects above, it is indicated that the porphyries are a non-metallogenic rock mass having small prospecting potential, not delineate a target region.

With a Beimulang region of Tibet as an example below, metallogenic potential is determined according to the above method.

Figure 2:
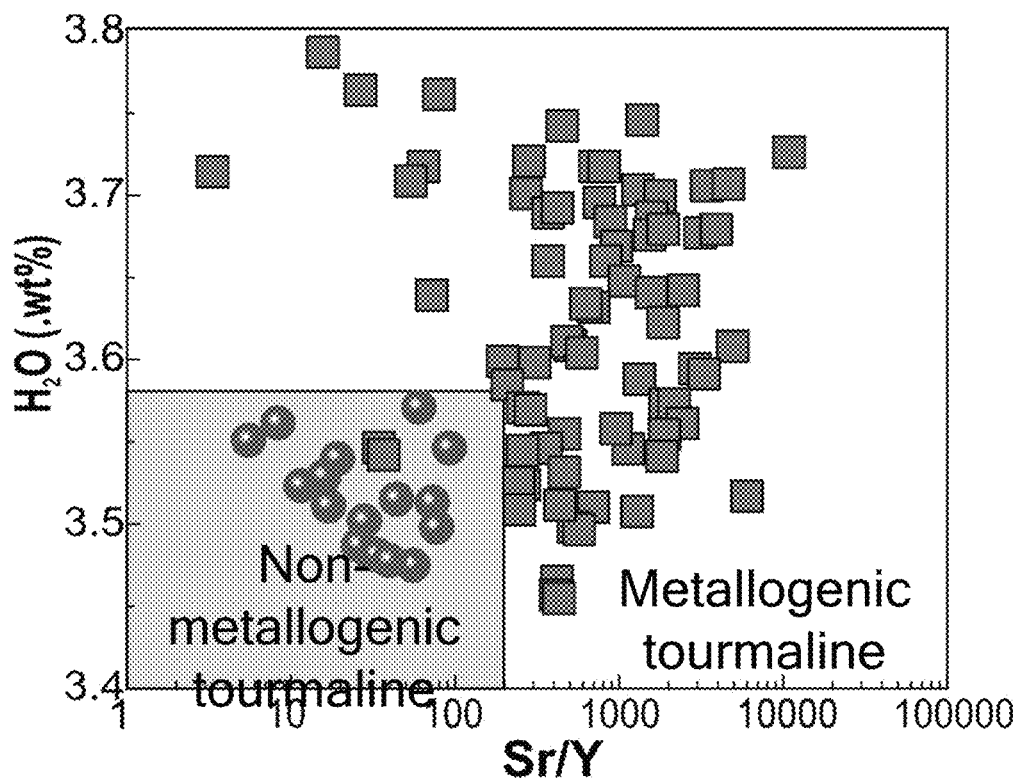
FIG. 2 is a diagram of $H_2O$ vs. Sr/Y of tourmaline of a Beimulang region.
Figure 3:
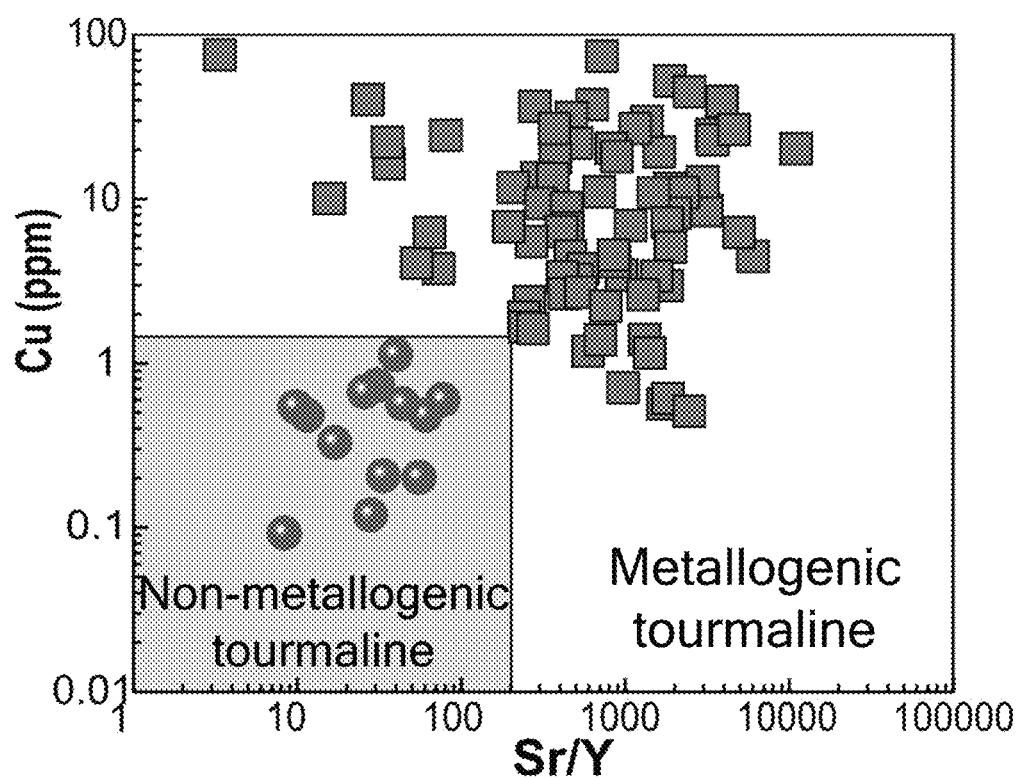
FIG. 3 is a diagram of Cu vs. Sr/Y of tourmaline of a Beimulang region.
Figure 4:
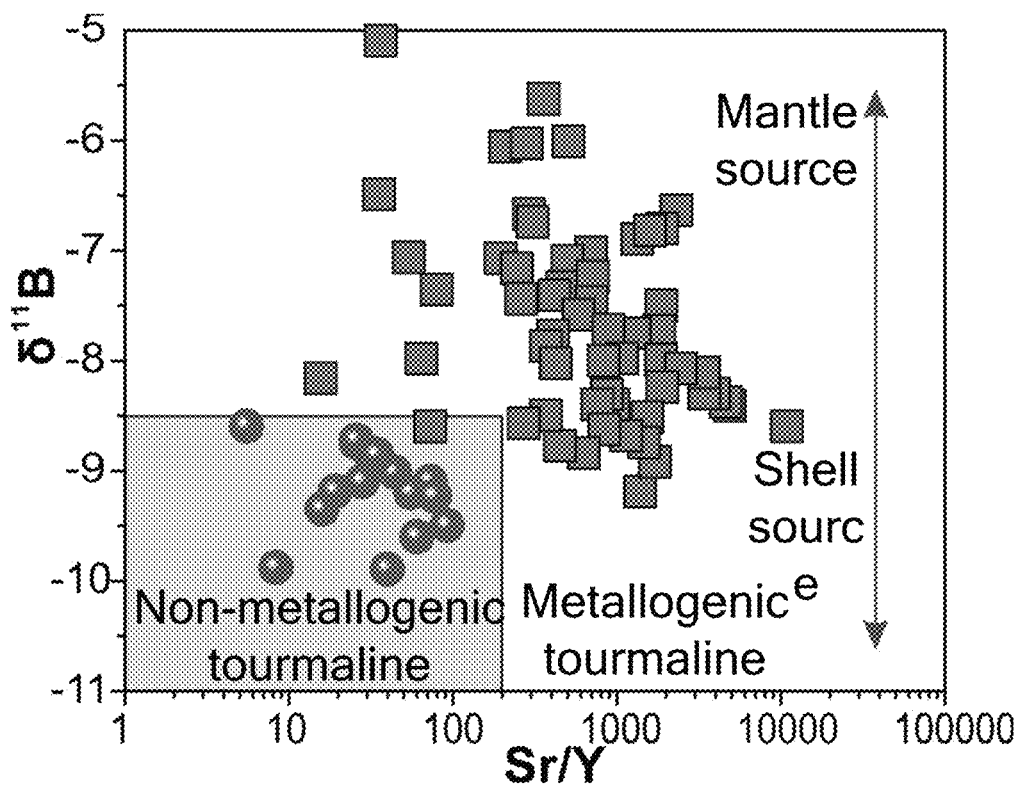
FIG. 4 is a diagram of $\delta^{11}B$ vs. Sr/Y of tourmaline of a Beimulang region.

(1) collect geological data, geophysical data and geochemical data according to a selected research region, comprehensively analyze a metallogenic prospect, and delineate a favorable metallogenic section in a Gangdise metallogenic belt;

(2) collect samples: select two regions for granite possibly having metallogenic potential in the favorable metallogenic section of the Gangdise metallogenic belt, and collect a series of representative samples;

(3) analyze and compute data with reference to S3;

(4) determined oxygen fugacity, a water content, and a metal content and source on samples from the two regions of Beimulang according to S4 of the embodiment to find out the samples have metallogenic potential, represent region 1 by circles, and represent area 2 by squares, where a content of $Fe^{3+}/(Fe^{2+}+Fe^{3+})$ of the sample in region 1 is between 0.25 and 0.4 (FIG. 1), $H_2O$ is between 3.45 and 3.58 (FIG. 2), a content of Cu is between 0.10 and 1.05 (FIG. 3), and $\delta^{11}B$ is between −10 and −9.5 (FIG. 4). These data indicate that tourmaline in region 1 has a low water content, oxygen fugacity and a metal content, and has no contribution of a mantle-derived material in combination with a determination criterion in S4. Therefore, the tourmaline in the region has no metallogenic potential. No porphyry copper has been found in the region through later verification.

A content of $Fe^{3+}/(Fe^{2+}+Fe^{3+})$ of the sample in region 2 is between 0 and 0.7 (FIG. 1), $H_2O$ is between 3.45 and 3.78 (FIG. 2), a content of Cu is between 0.17 and 100 (FIG. 4), and $\delta^{11}B$ is between −8 and −5 (FIG. 4). These data indicates that the tourmaline in region 2 has a high water content, oxygen fugacity, a metal content and contribution of a mantle-derived material in combination with a determination criterion in S4, which satisfies the metallogenic potential of the porphyry in S4. Therefore, the tourmaline in the region has metallogenic potential. A porphyry deposit of Beimulang is also found in the region through later verification.

What is not mentioned above is applied to the prior art. Although some specific embodiments of the present disclosure have been described in detail by means of examples, those skilled in the art should understand that the above examples are only for illustration and not for limitations to the scope of the present disclosure. Those skilled in the technical field to which the present invention belongs can make various modifications or supplements to the particular embodiments described or replace the particular embodiments in a similar way, without departing from the direction of the present disclosure or exceeding the scope defined by the appended claims. Those skilled in the art should understand that any modification, equivalent replacement, and improvement that are made to the above implementation modes according to the technical essence of the present disclosure shall be encompassed in the scope of protection of the present disclosure.

What is claimed is:

1. A method for determining metallogenic potential of a porphyry by using trace elements and a B isotope of tourmaline, comprising:

S1, delineating a metallogenic section:

collecting geological data, geophysical data and geochemical data according to a selected research region, comprehensively analyzing a metallogenic prospect, and delineating a favorable metallogenic section;

S2, collecting samples:

collecting the samples from porphyries having metallogenic potential in the favorable metallogenic section, and picking out tourmaline in the samples;

S3, analyzing the tourmaline:

analyzing major elements of the tourmaline: observing features of the corresponding tourmaline under a microscope and a cathode luminescence image, recording petrographic features of the tourmaline in detail, analyzing contents of the major elements in the tourmaline in different regions by using an electron probe to obtain a molecular formula of the tourmaline, and determining a content of $H_2O$ in the tourmaline with the molecular formula of the tourmaline;

analyzing trace elements of the tourmaline: carrying out laser ablation inductively coupled plasma mass spectrometry in-situ micro-region element analysis on the tourmaline samples to obtain contents of the trace elements, comprising contents of Sr, Y and Cu elements, of the tourmaline of each test point; and analyzing the B isotope of the tourmaline: carrying out multi-acceptance laser ablation inductively coupled plasma mass spectrometry in-situ B isotope analysis on the tourmaline samples to obtain $\delta^{11}B$ isotope composition of each test point;

S4, determining metallogenic potential of the porphyry with oxygen fugacity, water content, and metal content and source:

wherein the oxygen fugacity is determined by: analyzing data obtained from analysis of the major elements, if a ratio of $Fe^{3+}/(Fe^{2+}+Fe^{3+})$ is less than 0.45 and a ratio of Mg/(Mg+Fe) is less than 0.5, it is indicated that the porphyries have no metallogenic potential of a porphyry, and otherwise, it is indicated that the porphyries containing the tourmaline have potential to form porphyry copper;

the water content is determined by: analyzing data obtained by analyzing the major element and analyzing the trace elements, if a content of $H_2O$ is less than 3.58 and a ratio of Sr/Y is less than 200, it is indicated that the porphyries have no metallogenic potential of a porphyry, and otherwise, it is indicated that the porphyries containing the tourmaline have the potential to form the porphyry copper;

the metal content is determined by: analyzing data obtained by analyzing the trace elements, if a content of Cu is less than 1.5 and a ratio of Sr/Y is less than 200, it is indicated that the porphyries have no metallogenic potential of a porphyry, and otherwise, it is indicated that the porphyries containing the tourmaline have a high content of Cu and have the potential to form the porphyry copper; and the source is determined by: analyzing data obtained by analyzing the B isotope, if the tourmaline in the porphyries satisfies a content of $\delta^{11}B$ being between −8.5 and −5 and a ratio of Sr/Y being lower than 200, it is indicated that the porphyries have a contribution of mantle-derived magma and have the potential to form a porphyry copper deposit;

if the porphyries is determined to have the high water content, oxygen fugacity and metal content of the magma according to above four determination conditions, the porphyries have a contribution of a mantle-derived material, and have excellent copper metallogenic potential, the porphyries are capable of being determined as a copper metallogenic rock mass, and a possibility of finding copper is greater than 80%, a prospecting target region is delineated within a certain radius according to an exposure position of the porphyry; and otherwise the porphyries are a non-metallogenic rock mass having small prospecting potential, and a target region is not delineated.

2. The method according to claim 1, wherein the major elements comprise Si, Al, Fe, Mg, Mn, $Fe^{2+}$, $Fe^{3+}$, Ca, Na, K, P and F.

* * * * *